United States Patent
Fouarge

(10) Patent No.: US 7,696,288 B2
(45) Date of Patent: Apr. 13, 2010

(54) OLEFIN POLYMERIZATION PROCESS WITH SEQUENTIAL DISCHARGING

(75) Inventor: Louis Fouarge, Dilbeek (BE)

(73) Assignee: Total Petrochemicals Research Feluy, Feluy (BE)

( * ) Notice: Subject to any disclaimer, the term of this patent is extended or adjusted under 35 U.S.C. 154(b) by 867 days.

(21) Appl. No.: 11/501,179

(22) Filed: Aug. 7, 2006

(65) Prior Publication Data

US 2008/0171838 A1 Jul. 17, 2008

(51) Int. Cl.
*C08F 2/12* (2006.01)
*B01J 4/00* (2006.01)

(52) U.S. Cl. .............................. 526/64; 526/65; 422/132

(58) Field of Classification Search .................. 526/64, 526/65, 88; 422/132
See application file for complete search history.

(56) References Cited

U.S. PATENT DOCUMENTS 7,015,289 B2 * 3/2006 Hottovy et al. ................. 526/64

2005/0272891 A1 * 12/2005 Fouarge et al. .............. 526/943

FOREIGN PATENT DOCUMENTS

EP 1564228 A1 * 8/2005

* cited by examiner

*Primary Examiner*—Fred M Teskin
(74) *Attorney, Agent, or Firm*—Tenley R. Krueger

(57) ABSTRACT

The present invention relates to a polymerization process for producing olefin polymers in a loop reactor comprising two or more settling legs, comprising the steps of: —introducing into the loop reactor one or more olefin reactants, polymerization catalysts and diluents, and while circulating said reactants, catalysts and diluents; —polymerizing said one or more olefin reactants to produce a polymer slurry comprising essentially liquid diluent and solid olefin polymer particles; said process further comprising one or more cycles of: (a) allowing said polymer slurry to settle into said setting legs, and (b) sequentially discharging said settled polymer slurry from said two or more settling legs out of the reactor, whereby the aggregate time of discharge of all the legs is more than 50%, preferentially more than 80% and most preferably more than 95% of the time interval between two triggerings of the same settling leg.

18 Claims, 3 Drawing Sheets

OLEFIN POLYMERIZATION PROCESS WITH SEQUENTIAL DISCHARGING

FIELD OF THE INVENTION

The present invention relates to improvements in the removal of polymer slurry from a reactor for olefin slurry polymerization. More in particular the present invention relates to olefin polymerization process wherein the produced polymer is sequentially discharged through sequentially operated settling legs.

BACKGROUND OF THE INVENTION

Olefin polymerizations such as ethylene polymerization are frequently carried out using monomer, diluent and catalyst and optionally co-monomers in a loop reactor. The polymerization is usually performed under slurry conditions, wherein the product consists usually of solid particles and is in suspension in a diluent. The slurry contents of the reactor are circulated continuously with a pump to maintain efficient suspension of the polymer solid particles in the liquid diluent, the product being often taken off by means of settling legs which operate on a batch principle to recover the product. Settling in the legs is used to increase the solids concentration of the slurry finally recovered as product slurry. The product is further either transferred to another reactor or discharged to a flash tank, through flash lines, where most of the diluent and unreacted monomers are flashed off and recycled. The polymer particles are dried, additives can be added and finally the polymer is extruded and pelletized. This technique has enjoyed international success with millions of tons of ethylene polymers being so produced annually.

In these polymerization processes, settling legs, however, do present some problems. They represent the imposition of a "batch" or "discontinuous" technique onto a basic continuous process. Each time a settling leg reaches the stage where it "discharges" or "fires" accumulated polymer slurry it causes interferences on the pressure in the loop reactor, which is thereby not kept constant. Pressure fluctuations in the loop reactor may be larger than 1 bar. At very high monomer concentration, such pressure fluctuations may generate several problems such as the creation of gas bubbles that may cause trouble in the operation of the circulation pump. They may also provoke perturbations in the control scheme of the reactor pressure.

Various alternative product removal techniques are however known. For example, WO 01/05842 describes an apparatus for removing concentrated slurry from a flowing stream of slurry in a conduit characterized by a channel in an outlet area of the conduit, the outlet being adapted to continuously remove slurry.

EP 0891990 describes an olefin polymerization process wherein the product slurry is recovered by means of a continuous product take off, more in particular by means of an elongated hollow appendage provided on the reactor. Said hollow appendage being in direct fluid communication with a heated flash line and thus being adapted for continuous removal of product slurry.

However the above-described apparatus and processes have the disadvantage that the suspension withdrawn from the reactor still contains a large amount of diluent and of other reactants, such as the monomer, which it is then necessary to subsequently separate from the polymer particles and to treat for the purpose of reusing it in the reactor. Another disadvantage of the above-described apparatus and processes is their lack of flexibility during the phase or reaction start-up or in response to large disruptions in the normal behavior of the reactor, like sudden interruption of one of the feed streams.

It is therefore an object of the present invention to provide a polymerization process occurring in a loop reactor wherein the polymer slurry is efficiently removed from the loop reactor through sequentially operated setting legs. It is further an object of the present invention to establish non-fluctuating reaction conditions in a reactor during a polymerization process. More in particular, it is an object of the invention to preserve, pressure and to avoid pressure fluctuation in a polymerization reactor. Another object of the present invention is to increase the reactor throughput by providing stable operation conditions. A further object is to increase the monomer concentrations in the liquid medium. Another object of the present invention is to increase the weight percent (wt %) of polymer solids in the polymerization slurry circulating in the polymerization zone in the loop reactor. It is a further object of the invention to provide a flexible process that can be routinely converted to conventional setting leg removal mode in order to adapt to sudden disruption of the operating conditions caused for example by sudden large modification of the diluent or monomer feed throughput rates or start-up conditions.

SUMMARY OF THE INVENTION

These present objects are achieved by the processes according to the present invention.

In a first aspect the present invention therefore relates to a polymerization process for producing olefin polymers in a loop reactor comprising two or more settling legs, comprising the steps of introducing into the loop reactor one or more olefin reactants, polymerization catalysts, diluents and, optionally, additives, and while circulating said reactants, catalysts, diluents and optional additives, polymerizing said one or more olefin reactants to produce a polymer slurry comprising essentially liquid diluent and solid olefin polymer particles, said process further comprising one or more cycles of:

(a) allowing said polymer slurry to settle into said setting legs, and (b) sequentially discharging said settled polymer slurry from said two or more settling legs out of the reactor, whereby the aggregate time of discharge of the legs is more than 50%, preferentially more than 80% and most preferably more than 95% of the time interval between two triggerings of the same setting leg.

Surprisingly, it has been found that such operation of the settling legs reduces significantly the disadvantages of the batch operation of the setting legs and allows operation of the reactor at much higher solids concentration. Hence concentrations of greater than 40 weight percent are possible in accordance with this invention.

Furthermore, the present invention also enables to establish non-fluctuating reaction conditions in a reactor during a polymerization process. More in particular, the processes according to the present invention allow to preserve pressure in the reactor at an optimized value and to avoid pressure fluctuation in a polymerization reactor. In particular, this feature is obtained by providing a process wherein the setting legs are alternatingly opened and closed such that the settling legs are alternatingly discharged. By sequentially opening and closing subsequent settings legs, the process provides that the time when no setting leg is open and when pressure builds up in the reactor is significantly reduced and may even be absent, generating a pressure behavior of the reactor similar to the pressure profile obtained during continuous take-out techniques.

The present invention will be further disclosed in detail hereunder. The description is only given by way of example and does not limit the invention. The reference numbers relate to the hereto-annexed figures.

DETAILED DESCRIPTION OF THE INVENTION

Figure 1:
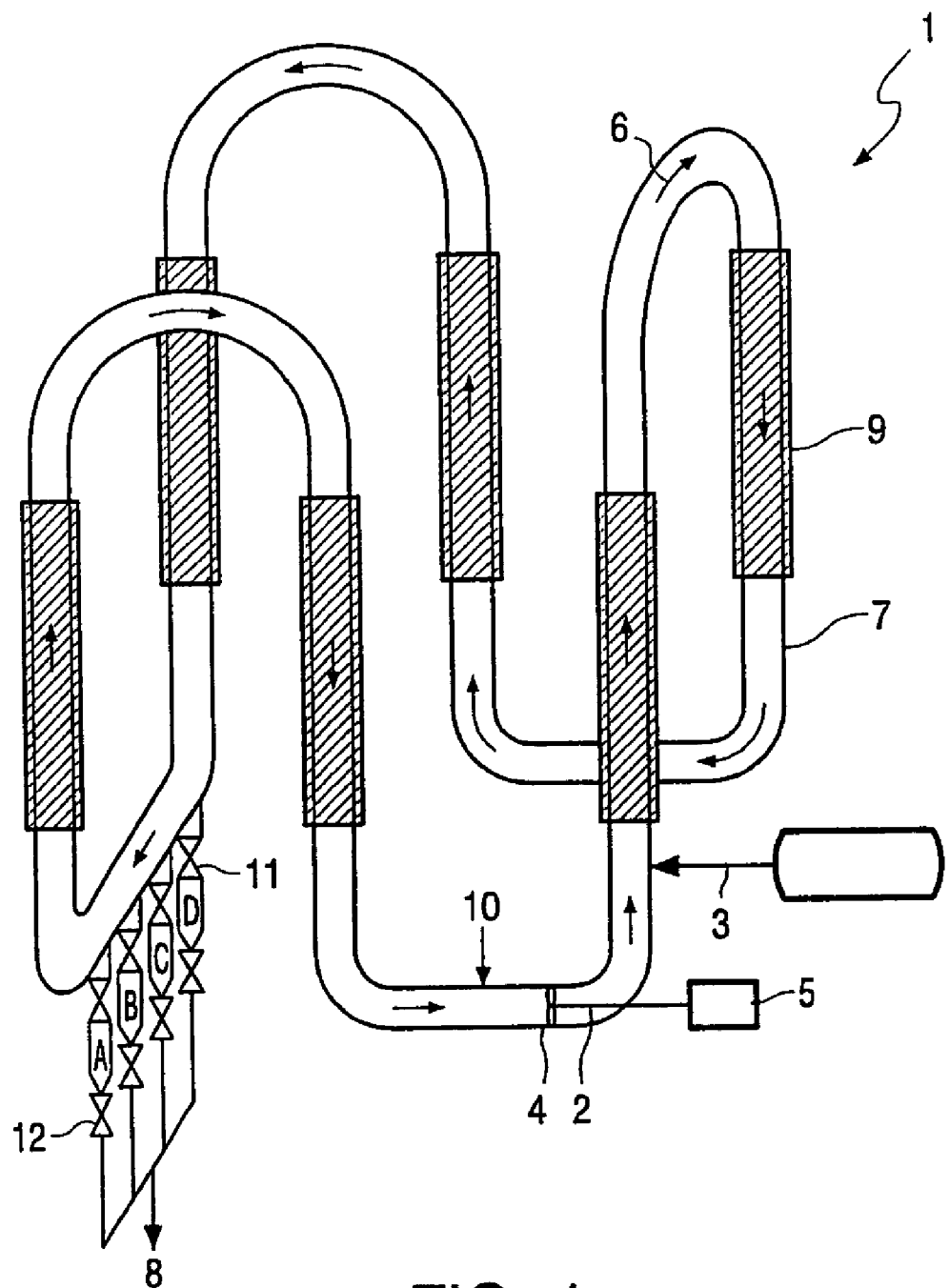
FIG. 1 represents a schematic perspective view of a single loop polymerization reactor.

This invention relates to an olefin polymerization process in a loop reactor utilizing a diluent, so a to produce a product slurry of polymer and diluent. This invention more in particular relates to a polymerization processes for the production of polymer, wherein a polymerization effluent is formed which is a slurry of particulate polymer solids suspended in a liquid medium, ordinarily the reaction diluent and unreacted monomers.

The present invention is applicable to any process producing an effluent comprising a slurry of particulate polymer solids suspended in a liquid medium comprising a diluent and unreacted monomer. Such reaction processes include those which have come to be known in the art as particle form polymerizations.

The settled polymer slurry may be discharged from said two or more settling legs through discharge valves in a predetermined sequential pattern so that the aggregate time of discharge for all the legs is more than 50%, preferentially more than 80% and most preferably more than 95% of the time between two triggerings of the same settling leg. In a most preferred embodiment the aggregate time of discharge for all the legs is from 95% to 100% of the time duration between two triggerings of the same settling leg.

As used herein the term "aggregate time of discharge" refers to the sum of the duration over which the discharge valve of each settling leg is open, said sum being across all settling legs and being limited to a single opening of each settling leg.

By keeping at least one settling leg open more than 50%, preferably more than 80%, most likely more than 95% and most preferably 100% of the time between two consecutive triggerings of any single settling leg, fluctuations of reaction conditions in the reactor, and in particular of pressure values, are significantly reduced and even may be avoided.

The present process comprises the step of maintaining a flow of settled polymer slurry out of said reactor by sequentially discharging said setting leg.

The present process according to the invention provides several advantages over the prior art including: allowing for a stable pressure profile of the product recovery zone (e.g. a stable pressure profile at the gas outlet of the flash tank allows a better operation of the recycle gas compressor); because of minor or even absent pressure drops of the reactor, significantly increasing the maximum monomer concentration in the loop reactor liquid medium thereby increasing reactor throughput; significantly increasing the wt % of polymer solids in the polymerization slurry. Another advantage of the present processes is an easier response to a sudden drop in reactor pressure, which can happen if the monomer flow is quickly reduced. The present invention also enables to establish non-fluctuating reaction conditions in a reactor during a polymerization process. More in particular, the processes according to the present invention allow to preserve pressure in the reactor at a certain value and to avoid pressure fluctuation in a polymerization reactor. Furthermore, polymerization product slurry discharging operated according to the present invention allows the monomers concentrations to be limited only by the monomer solubility in the liquid diluent in the reactor, thereby increasing the specific reaction rate for polymerization and increasing reactor throughput.

More in particular, the present invention relates to a polymerization process for the manufacture of particulate olefin polymers consisting of the catalytic polymerization of olefins such as $C_2$ to $C_8$ olefins in a diluent containing the monomer to be polymerized, the polymerization slurry being circulated in a loop reactor to which the starting material is fed and from which the polymer formed is removed. Examples of suitable monomers include but are not limited to those having 2 to 8 carbon atoms per molecule, such as ethylene, propylene, butylene pentene, butadiene, isoprene, 1-hexene and the like.

The polymerization reaction can be carried out at a temperature of from 50 to 120° C., preferably at temperature of from 70 to 115° C., more preferably at temperature of from 80 to 110° C., and at a pressure of from 20 to 100 bars, preferably at pressure of from 30 to 50 bars, more preferably at pressure of 37 to 45 bars.

In a preferred embodiment, present invention is particularly suitable for the polymerization of ethylene in isobutane diluent. Suitable ethylene polymerization includes but is not limited to homopolymerization of ethylene, copolymerization of ethylene and a higher 1-olefin co-monomer such as 1-butene, 1-pentene, 1-hexene, 1-octene or 1-decene. In an embodiment of the present invention, said co-monomer is 1-hexene.

Ethylene polymerizes in a liquid diluent in the presence of a catalyst, optionally a co-catalyst, optionally co-monomer, optionally hydrogen and optionally other additives, thereby producing a polymerization slurry.

As used herein, the term "polymerization slurry" or "polymer slurry" means substantially a multi-phase composition including at least polymer solid particles and a liquid phase and allow for a third phase (gas) to be at least locally present in the process, the liquid phase being the continuous phase. The solids include catalyst and polymerized olefin, such as polyethylene. The liquids include an inert diluent, such as isobutane, with dissolved monomer such as ethylene and optionally, one or more co-monomers, molecular weight control agents, such as hydrogen, antistatic agents, antifouling agents, scavengers, and other process additives.

Suitable diluents (as opposed to solvents or monomers) are well known in the art and include hydrocarbons which are inert or at least essentially inert and liquid under reaction conditions. Suitable hydrocarbons include isobutane, n-butane, propane, n-pentane, isopentane, neopentane, isohexane and n-hexane, with isobutane being preferred.

Suitable catalysts are well known in the art. Examples of suitable catalysts include but are not limited to chromium oxide such as those supported on silica, organometal catalysts including those known in the art as "Ziegler" or "Ziegler-Natta" catalysts, metallocene catalysts and the like. The term "co-catalyst" as used herein refers to materials that can be used in conjunction with a catalyst in order to improve the activity of the catalyst during the polymerization reaction.

The polymerization slurry is maintained in circulation in a loop reactor comprising vertical jacketed pipe sections connected through elbows. The polymerization heat can be extracted by means of cooling water circulating in the jacket of the reactor. Said polymerization may be performed in a single or in two or more loop reactors, which can be used in parallel or in series. Said reactors operate in a liquid full mode. When used in series they can be connected through means such as for example through one or more settling legs of the first reactor.

The produced polymer is discharged according to the process of the present invention from the loop reactor along with some diluent through two or more settling legs in which the solid content is increased with respect to its concentration in the body of the reactor.

Sequentially discharging includes also the situations where said settling legs may be alternately or simultaneously discharged.

According to an embodiment of the present invention, the rate of discharge of the polymer slurry is such as to allow substantially uninterrupted outgoing flow from the loop reactor (from the points of discharge of the polymer slurry through two or more settling legs and also through the product recovery zone) equal to the in-going flow of feeds to the reactor.

As used herein the term "substantially uninterrupted" refers to a flow that can be interrupted no more than 50% of the time, preferably no more than 20% of the time, most preferably no more than 5% of the time.

The rate of discharge of the polymerization slurry out of the reactor and into a product recovery zone is such as to maintain a pressure as constant as possible in the slurry reactor and to eliminate intermittent low-pressure pulses associated with a more important and more sudden discharge of a portion of the reactor contents that occurs with the conventional batch operating settling legs on slurry reactors.

As used herein "product recovery zone" includes but is not limited to heated or not heated flash lines, flash tank, cyclones, filters and the associated vapor recovery and solids recovery systems or transfer lines to another reactor or said other reactor when several reactors are connected in series.

When no reactor is present downstream of the settling legs, the extracted slurry may be depressurized and transferred through for example heated or not heated flash lines to a flash tank where the polymer and the unreacted monomer and/or co-monomer and diluent are separated. The degassing of the polymer may be further completed in a purge column.

When at least one reactor is present downstream of the setting legs the discharged slurry is transferred through transfer lines to the next reactor. Transfer is made possible by injecting the slurry in the downstream reactor in a point where the pressure is lower than the pressure at the outlet of the setting legs.

Referring now to the drawings, FIG. 1 schematically illustrates an example of a single loop reactor 1 suitable for the polymerization process according to the invention. Said polymerization process is carried out in said single loop reactor 1 which typically comprises a plurality of interconnected pipes 7 such as a plurality of vertical pipe segments, a plurality of upper lateral pipe segments, a plurality of lower lateral pipe segments, wherein each of said vertical pipe segment is connected at an upper end thereof to one of said upper lateral pipe segment and is connected at a lower end thereof to one of said lower lateral pipe segments through elbow shaped connecting segments, thus defining a continuous flow path for said slurry. It will be understood that while the loop reactor 1 is illustrated with six vertical pipes, said loop reactor 1 may be equipped with less or more pipes, such as 4 or more pipes, for example between 4 and 20 vertical pipes. The vertical sections of the pipe segments 7 are preferably provided with heat jackets 9. Polymerization heat can be extracted by means of cooling water circulating in these jackets of the reactor. Reactants are introduced into the reactor 1 by line 3. Catalyst, optionally in conjunction with a co-catalyst or activation agent, is injected in the reactor 1 by means of the conduit 10. In a preferred embodiment, catalysts are introduced through conduit 10 just upstream from the circulation pump, and diluent, monomer, optional co-monomers and reaction additives are introduced through line 3 just downstream of the circulation pump.

The polymerization slurry is directionally circulated throughout the loop reactor 1 as illustrated by the arrows 6 by one or more pumps, such as axial flow pump 2. The pump may be powered by an electric motor 5. As used herein the term "pump" includes any device from compressing driving, raising the pressure of a fluid, by means for example of a piston or set of rotating impellers 4.

The reactor 1 is further provided with two or more settling legs connected to the pipes 7 of the reactor 1. Polymerization slurry may be removed from the loop reactor by discharge of the slurry settled in said two or more settling legs into one or more product recovery lines 8, e.g. into a product recovery zone.

As illustrated in FIG. 1, one of the horizontal sections of the loop reactor is equipped with four settling legs A, B, C and D. In a preferred embodiment the processes according to the present invention are performed in a loop reactor comprising at least two settling legs. In another embodiment the processes according to the present invention are performed in a loop reactor comprising 2 to 20 settling legs, preferably 4 to 12 settling legs, more preferably 6 to 10 settling legs. The settling legs can be located on any segment or any elbow of said reactor. In said settling legs the polymerization slurry settles so that the slurry exiting the reactor is more concentrated in solid than the circulating slurry. This permits to limit the quantity of diluent that has to be treated and re-fed to the reactor for example for the last reactor of a multiple reactor set-up. This also limits the transfer of reactants into the next reactor, which should be minimum when loop reactors are in series as mentioned in patent EP 649 860. It will be understood that the discharge of said settling legs may be operated in a continuous sequential or discontinuous mode, but preferably in a sequential mode.

The settling legs are preferably provided with isolation valves 11. These valves 11 may be ball valves for example. These valves 11 are open under normal conditions and can be closed for example to isolate a settling leg from operation. Said valves can be closed when the reactor pressure falls below a chosen value. Furthermore, the settling legs can be provided with product take off or discharge valves 12.

In an embodiment of the present invention, the discharging is obtained by synchronizing the opening and closing time of the discharge valve 12 of each settling leg thereby maintaining a flow of settled polymer slurry out of said reactor.

The discharge valve 12 that can be used in this invention may be any type of valve which can permit efficient discharge of a polymer slurry, when it is fully open. An angle valve, or ball valves may be suitably used. For example, the valve may have such a structure that solid matter is prevented from accumulating or precipitating at the main body portion of the valve. However, the type and structure of the discharge valve can be selected by those skilled in the art as required. A part or the totality of the leg is discharged at each opening of the discharge valve.

In a preferred embodiment, the discharge from each individual settling leg is adjusted so that the amount of settled slurry discharged through the valve into the product recovery zone is less than 10% larger or smaller than the amount that settles in said individual leg between two consecutive openings of said valve.

Figure 2A:
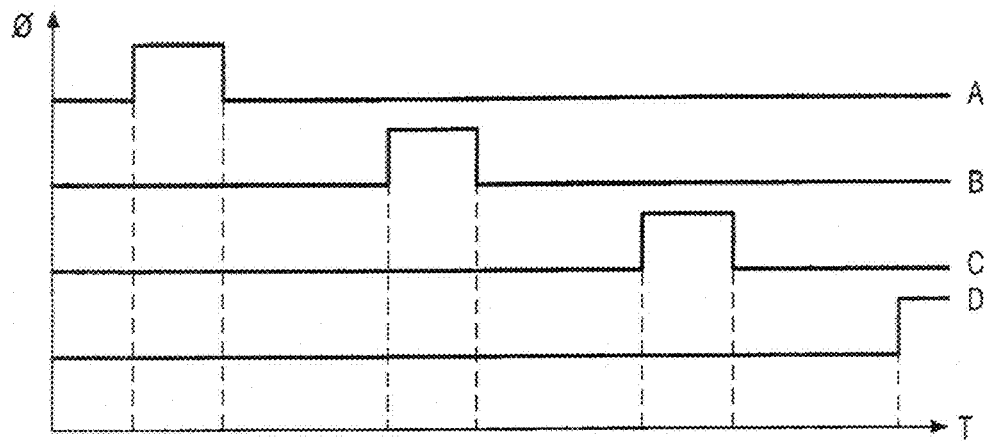
FIG. 2A represents a flow diagram for settling legs operating according to the prior art.
Figure 2B:
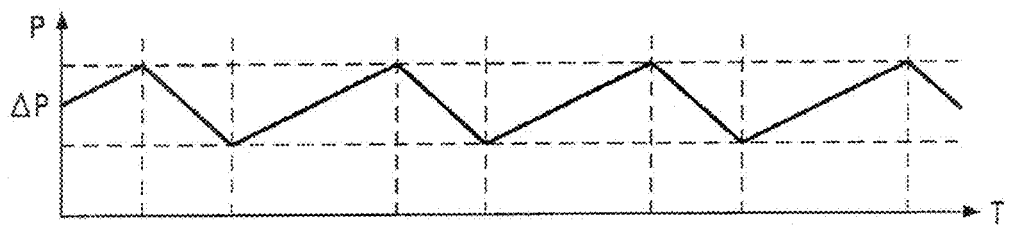
FIG. 2B represents a graph of the pressure measured as a function of time in a reactor operating according to the prior art.

Referring now to FIG. 2A, said Figure represents a flow diagram for settling legs operating according to the prior art. Time is along the abscissa. Each line represents the status Ø of one of the settling leg. For this schematic drawing, four legs A, B; C and D are considered. This number of legs is taken as a matter of example but the method applies to any number of legs larger than one. Each of the four lines has two levels: a low level indicating that that particular leg is closed and a high level indicating that it is open. In this prior art, there is a time interval during which the settling legs are closed and the polymer slurry is not discharged. During such period of time the pressure in the reactor continuously increases due to continuous injection of feed into the reactor. In FIG. 2B a graph illustrating the influence of said discontinuous discharging flow on the pressure in the loop reactor is shown. The pressure is not kept constant and varies greatly between two discharging period. The pressure increases when all the legs are closed and decreases quickly when one leg opens. Pressure fluctuations ΔP in said loop reactor may be as high as 1 bar. Said pressure fluctuation causes many problems such as perturbations of the flow pattern, the risk of creation of gas bubbles in the reactor, due to the pressure dependency of the monomer solubility in the diluent, thereby limiting the productivity of the polymerization process. Thus, discontinuous discharge has the further disadvantage of limiting the concentration of the monomers in the loop reactor.

Figure 3A:
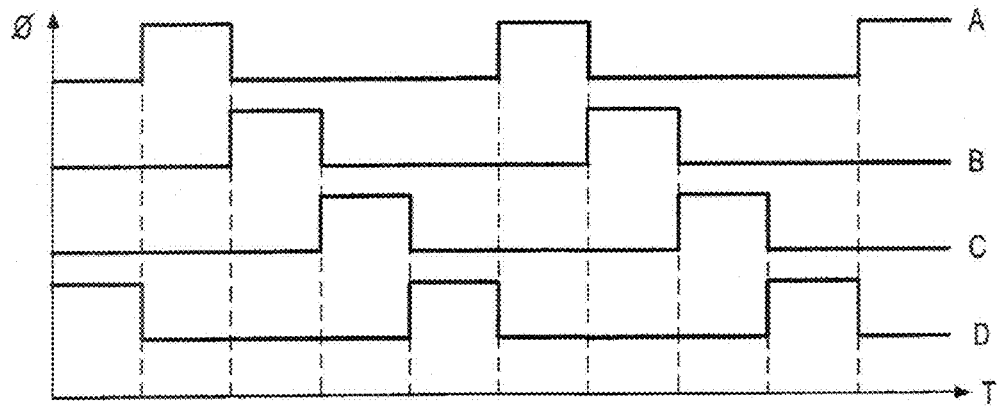
FIG. 3A represents a flow diagram for settling legs operating according to an embodiment of the present invention.

FIG. 3A represents a flow diagram for settling legs operating according to an embodiment of the present invention with sequential discharging of the legs. In this particular embodiment, when a given settling leg closes, the following one opens. In thus embodiments there is always one leg open. The rate of discharge of the polymer slurry is such as to maintain a flow of said settled slurry from said settling legs according to a preferred embodiment in this preferred embodiment, the aggregate time of discharge for all the legs is equal to 100% of the time interval between two triggerings of the same setting leg.

Figure 3B:
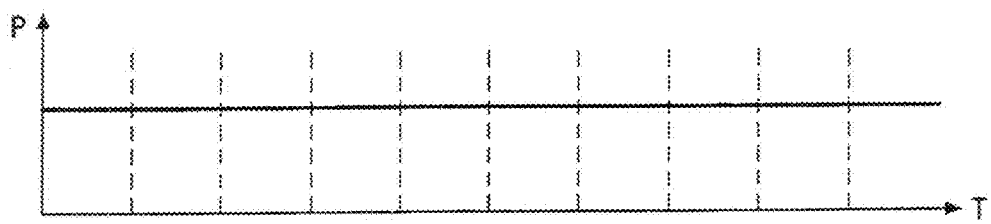
FIG. 3B represents a graph of the pressure measured as a function of time in a reactor operating according to the embodiment of the present invention corresponding to FIG. 3A.

FIG. 3B is a graph illustrating the influence of said sequential discharging with substantially uninterrupted flow on the pressure in the loop reactor is shown according to a preferred embodiment of the present invention. The rate of discharge of said settled slurry is such as to maintain a constant pressure in the slurry reactor and to eliminate intermittent low-pressure pulses associated with a more important and more sudden discharge of a portion of the reactor contents that occurs with the conventional batch operating setting legs on slurry reactors (FIG. 2A).

In a preferred embodiment the opening/closing of each settling leg as well as the discharge aperture of each settling leg is adjusted and synchronized so as to maintain a constant pressure in the reactors. In another preferred embodiment, the opening/closing of each settling leg as well as the discharge aperture of each settling leg is adjusted so that the aggregate time of opening for all the legs is more than 50%, preferentially more than 80%, preferably more than 95%, most preferably is 95% to 105% of the time interval between two triggerings of the same settling leg.

As illustrated on said FIG. 3A the opening time of a settling leg coincide with the closing time of a subsequent settling leg, such sequence carries until the last settling leg has been discharged, and the cycle starts again as to maintain a flow of settled slurry out of said reactor which is substantially uninterrupted.

More in particular, discharging of said polymer slurry from each sewing leg sequentially is performed in such a way that once the last settling leg has been discharged the first settling leg is discharged again, said process further comprising one or more cycles of:
(i) closing the discharge valve of a settling leg while simultaneously opening the discharge valve of another settling leg,
(ii) adjusting the flow through the discharge valves of said two or more setting legs so as to regulate the mass balance of the slurry within the reactor. This flow adjustment may be obtained, as an example, by adjusting the aperture of the discharge valve or of any flow-regulating device located close to the discharge valve.

The sequential opening cycle time of the discharge valve of each setting legs according to the present invention allows to maintain a constant pressure in the reactor.

Adjusting the aperture of the discharge valve of the settling leg includes but is not limited to reducing or enlarging the size of the opening of the discharge valve, or adding downstream of said discharge valve another flow regulating device of adjustable smaller aperture or an adjustable reduction of smaller aperture.

In an embodiment of the present process, the opening of a settling leg is triggered by the closing of another settling leg and the closing of a settling leg triggers the opening of another settling leg.

More in particular, the discharging is adjusted in such a way that the closing of a first settling leg and the opening of a subsequent settling leg start at the same time.

According to the present invention, the synchronizing and the triggering of the opening and closing of said settling legs are controlled by computational means. These computational means allow the adjustment and the control of the periodical opening at predetermined frequencies and sequence of the settling legs to maintain a flow of said settled slurry out of said reactor which is substantially uninterrupted. Other control means such as pressure or temperature controllers and flow controllers, flow transducers and flow sensors may be used to further fine-tune the discharging process The present invention encompasses different types of control means which accomplish the purpose of the invention. The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

The actuation and the control of the discharging step can be implemented using electrical analog, digital electronic, pneumatic, hydraulic, mechanical or other similar types of equipment or combinations of one or more such equipment types. A computational means is used in the preferred embodiment of this invention to operate and control the process parameters. Computers or other types of computing devices can be used in the invention.

The present invention also relates to computational means comprising a process controller operatively connected to the discharge valves of said settling legs.

The present invention further relates to a process for sequentially discharging through two or more settling legs, polymer slurry from a loop reactor so as to obtain a substantially uninterrupted flow of said slurry into a product recovery zone said process comprising the step of discharging said settled polymer slurry from said two or more settling legs through discharge valves in a predetermined sequential pattern so that the aggregate time of opening for all the legs is more than 50%, preferentially more than 80%, and most preferably more than 95% of the time interval between two triggerings of the same setting leg.

Figure 4:
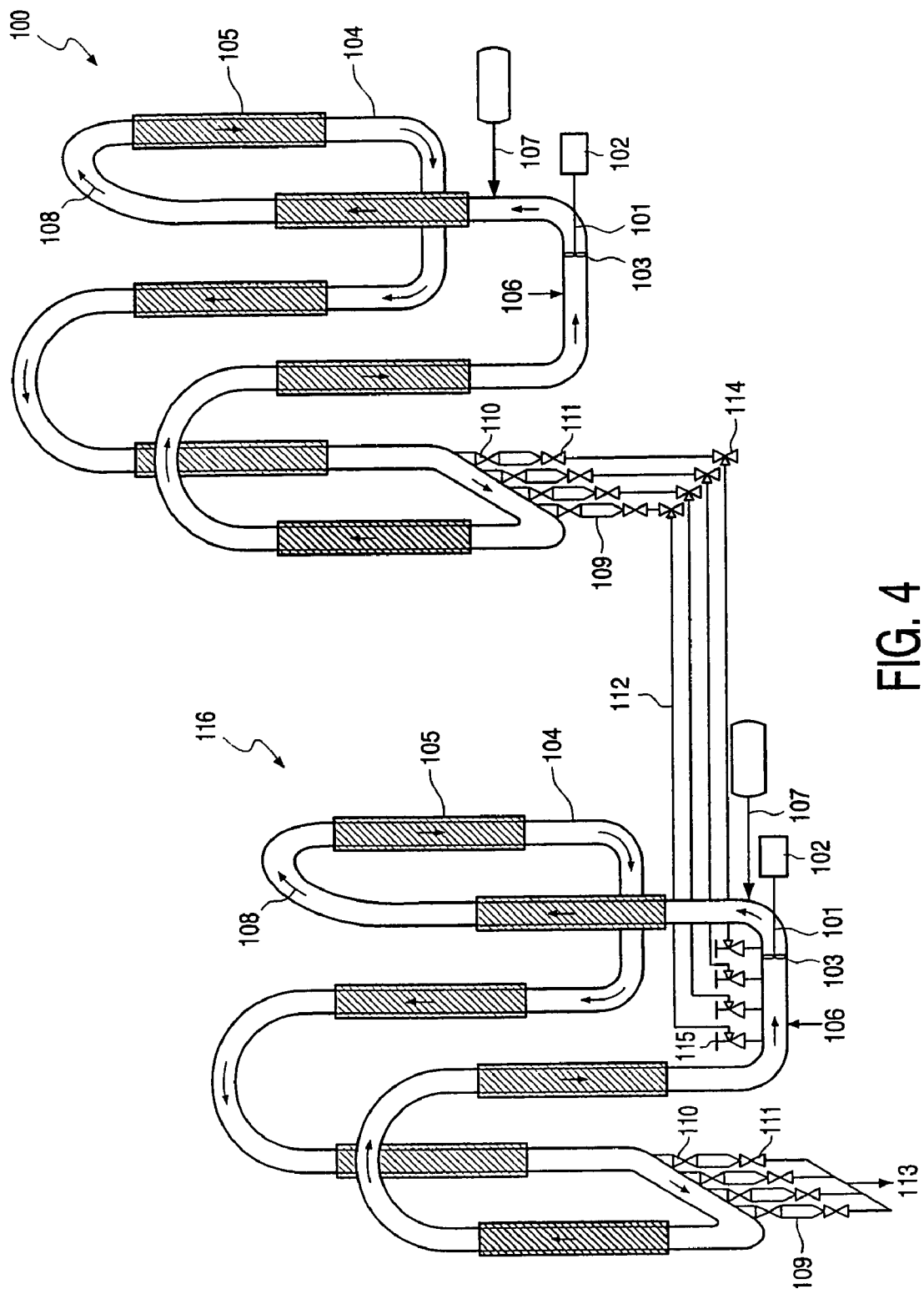
FIG. 4 represents a schematic perspective view of a double loop polymerization reactor.

The polymerization process according to the invention may further be performed in multiple loop reactors such as for example in a double loop reactor as illustrated in FIG. 4.

FIG. 4 represents two single loop reactors 100, 116, which are interconnected in series. Both reactors 100, 116 consist of a plurality of interconnected pipes 104. The vertical sections of the pipe segments 104 are preferably provided with heat jackets 105. Reactants are introduced into the reactors 100 by line 107. Catalyst, optionally in conjunction with a co-catalyst or activation agent, may be injected in one or both of the reactors 100 and 116 by means of conduit 106. The polymerization slurry is directionally circulated throughout the loop reactors 100, 116 as illustrated by the arrows 108 by one or more pumps, such as axial flow pump 101. The pumps may be powered by an electric motor 102. The pumps may be provided with set of rotating impellers 103. The first reactor 100, is further provided with two or more settling legs 109 connected to the pipes 104 of said reactor 100. The second reactor 116 is further provided with one or more settling legs 109 connected to the pipes 104 of said reactor 116. Said second reactor 116 can be conventionally discharged. In a preferred embodiment, said second reactor 116 is provided with two or more settling legs 109 which are discharged according to embodiments of the present invention. The settling legs 109 are preferably provided with an isolation valve 110. Further the settling legs can be provided with product take off or discharge valves 111 or can be in direct communication with the downstream section. Downstream the exit of the settling leg 109 of reactor 100, a transfer line 112 is provided which allows to transfer polymer slurry settled in the settling legs 109 to the other reactor 116, preferably through a piston valve 115. Along the transfer line 112, a three-way valve 114 may divert the flow to a product recovery zone if the multiple loop reactor has to be used in a parallel configuration. Polymer slurry settled in the settling legs 109 of reactor 116 can be removed by means of one or more product recovery lines 113, e.g. to a product recovery zone.

It has been observed that by sequentially discharging settled polymer slurry from a loop reactor according to the present process, higher weight percent solids can be circulated in the reactor. Furthermore, increased weight percent solids in the loop reactor increases catalyst residence time, increases catalyst productivity. Higher catalyst productivity also increase the weight percent solids removed from the reactor which reduces the diluent processing cost in recycle equipment. In addition the present invention enables to establish non-fluctuating reaction conditions in a reactor during a polymerization process. More in particular, the processes according to the present invention allow to preserve pressure in the reactor at a certain value and to avoid pressure fluctuation in a polymerization reactor. Furthermore, the process according to the present invention also reduces the pressure fluctuations in the flash tank and the inlet of the recycle compressor what induces benefits in the reliability of said compressor. Furthermore, polymerization product slurry discharging operated according to the present invention allows the monomers concentrations to be adjusted by the monomer solubility in the liquid diluent in the reactor at a higher reference pressure, thereby increasing the specific reaction rate for polymerization and increasing the reactor throughput.

Although the present invention has been described with considerable detail with reference to certain preferred variations thereof, other variations are possible. Therefore, the spirit and scope of the appended claims should not be limited to the preferred variations described herein.

The invention claimed is:

1. A method for the polymerization of an olefin monomer in a loop reactor system comprising:
 a) introducing an olefin monomer and a diluent carrier liquid into a reactor system comprising at least one loop reactor;
 b) supplying at least one polymerization catalyst system to said reactor system;
 c) circulating said diluent liquid and olefin monomer through said loop reactor while polymerizing said olefin monomer in the presence of said catalyst system to produce a slurry of polymer fluff particles in said diluent carrier liquid;
 d) diverting the flow of said slurry through said loop reactor into a plurality of settling legs which are connected to said loop reactor and each of which are provided with an outlet valve which is repeatedly triggered to open said outlet valve to discharge settled polymer slurry from said settling leg and thereafter closed to allow polymer slurry to accumulate in said settling leg; and
 e) controlling the triggering of said outlet valves to provide an aggregate time of discharge from said plurality of settling legs which is more than 50 percent of the time interval between successive sequential triggerings of said outlet to allow for the discharge of slurry from said settling leg.

2. The method of claim 1 wherein the aggregate time of discharge from said plurality of settling legs is more than 80 percent of the time interval between successive sequential triggerings of said outlet valve in the same settling leg.

3. The method of claim 1 wherein the aggregate time of discharge from said plurality of settling legs is at least 95 percent of the time interval between successive sequential triggerings of said outlet valve.

4. The method of claim 1 wherein the aggregate time of discharge of said plurality of settling legs is within the range of 95-105 percent of the time interval between successive sequential triggerings of said outlet valve.

5. The method of claim 1 wherein the amount of slurry discharged from an individual settling leg is within the range of plus or minus 10 percent of the amount of polymer slurry which settles in said individual settling leg between two consecutive openings of said outlet valve.

6. The method of claim 1 further comprising correlating the opening of an outlet valve in one settling leg so that it opens concomitantly with the closing of the outlet valve in another settling leg.

7. The method of claim 6 wherein the opening of an outlet valve in one settling leg coincides with the closing of the outlet valve in another settling leg.

8. A method for the polymerization of an olefin monomer in a loop reactor system comprising:
 a) introducing an olefin monomer and a diluent carrier liquid into a reactor system comprising at least one loop reactor;

b) supplying at least one polymerization catalyst system to said reactor system;

c) circulating said diluent liquid and olefin monomer through said loop reactor while polymerizing said olefin monomer in the presence of said catalyst system to produce a slurry of polymer fluff particles in said diluent carrier liquid;

d) diverting the flow of said slurry through said loop reactor into a first settling leg connected to said reactor and provided with a first outlet valve that is triggered to open said outlet valve to allow for the withdrawal of polymer slurry from said settling leg and thereafter closed to allow polymer slurry to accumulate in said settling leg;

e) diverting the flow of said slurry through said loop reactor into a second settling leg connected to said reactor and provided with a second outlet valve that is triggered to open said second outlet valve to allow for the withdrawal of polymer slurry from said settling leg and thereafter closed to allow polymer slurry to accumulate in said second settling leg; and f) controlling the triggering of said first and second outlet valves to provide for an aggregate time of discharge from said first and second settling legs which is more than 50 percent of the time interval between the repeated triggerings of an outlet valve in at least one of said first and second settling legs.

9. The method of claim 8 wherein the aggregate time of discharge from said plurality of settling legs is more than 80 percent of the time interval between successive sequential triggerings of said outlet valve.

10. The method of claim 8 wherein the aggregate time of discharge from said plurality of settling legs is at least 95 percent of the time interval between successive sequential triggerings of said outlet valve.

11. The method of claim 8 wherein the aggregate time of discharge of said plurality of settling legs is within the range of 95-105 percent of the time interval between successive sequential triggerings of said outlet valve.

12. The method of claim 8 wherein the amount of slurry discharged from an individual settling leg is within the range of plus or minus 10 percent of the amount of polymer slurry which settles in said individual settling leg between two consecutive openings of said outlet valve.

13. The method of claim 8 further comprising a second loop reactor connected in series with said first loop reactor and wherein polymer slurry withdrawn from said first and second settling legs is supplied to said second loop reactor.

14. A method for the polymerization of an olefin monomer in a loop reactor system comprising:

a) introducing an olefin monomer and a diluent carrier liquid into a reactor system comprising at least one loop reactor;

b) supplying at least one polymerization catalyst system to said reactor system;

c) circulating said diluent liquid and olefin monomer through said loop reactor while polymerizing said olefin monomer in the presence of said catalyst system to produce a slurry of polymer fluff particles in said diluent carrier liquid;

d) diverting the flow of said slurry through said loop reactor into a first settling leg connected to said reactor and provided with a first outlet valve that is triggered to open said outlet valve to allow for the withdrawal of polymer slurry from said first settling leg and thereafter closed to allow polymer slurry to accumulate in said settling leg;

e) diverting the flow of said slurry through said loop reactor into a second settling leg connected to said reactor and provided with a second outlet valve that is triggered to open said second outlet valve to allow for the withdrawal of polymer slurry from said second settling leg and thereafter closed to allow polymer slurry to accumulate in said second settling leg;

f) diverting the flow of said slurry through said loop reactor into a third settling leg connected to said reactor and provided with a third outlet valve that is triggered to open said third outlet valve to allow for the withdrawal of polymer slurry from said third settling leg and thereafter closed to allow polymer slurry to accumulate in said third settling leg;

g) diverting the flow of said slurry through said loop reactor into a fourth settling leg connected to said reactor and provided with a fourth outlet valve that is triggered to open said fourth outlet valve to allow for the withdrawal of polymer slurry from said fourth settling leg and thereafter closed to allow polymer slurry to accumulate in said fourth settling leg; and h) controlling the triggering of said first, second, third and fourth outlet valves to provide for an aggregate time of discharge of said first, second, third and fourth settling legs which is more than 50 percent of the time interval between the repeated triggerings of an outlet valve in at least one of said settling legs.

15. The method of claim 14 wherein the aggregate time of discharge from said first, second, third and fourth settling legs is more than 80 percent of the time interval between successive sequential triggerings of said outlet valve in the same settling leg.

16. The method of claim 14 wherein the amount of slurry discharged from at least one of said first, second, third and fourth settling legs is within the range of plus or minus 10 percent of the amount of polymer which settles in said one of said settling legs between consecutive openings of the outlet valve in said settling leg.

17. The method of claim 14 further comprising correlating the opening of an outlet valve in one of said settling legs so that it opens concomitantly with the closing of the outlet valve in another of said settling legs.

18. The method of claim 14 further comprising a second loop reactor connected in series with said first loop reactor and whereby polymer withdrawn from said first, second, third and fourth settling legs is supplied to said second loop reactor.

* * * * *